July 28, 1970     A. T. VAN HUISEN     3,521,699

EARTH ENERGY CONSERVATION PROCESS AND SYSTEM

Filed April 16, 1969     2 Sheets-Sheet 1

INVENTOR.
ALLEN T. VANHUISEN
BY

July 28, 1970     A. T. VAN HUISEN     3,521,699

EARTH ENERGY CONSERVATION PROCESS AND SYSTEM

Filed April 16, 1969     2 Sheets-Sheet 2

INVENTOR.
ALLEN T. VANHUISEN
BY 3,521,699
EARTH ENERGY CONSERVATION PROCESS AND SYSTEM
Allen T. Van Huisen, Los Alamitos, Calif., assignor of twenty-five percent to Joseph Drnovich, Redondo Beach, Calif.
Continuation-in-part of application Ser. No. 632,782, Apr. 21, 1967. This application Apr. 16, 1969, Ser. No. 816,484
Int. Cl. E01c 19/45
U.S. Cl. 165—1
11 Claims

ABSTRACT OF THE DISCLOSURE

The following disclosure relates to a novel process and system designed to capture and transport heat energy from the depth of the earth to distribution systems designed to put such heat energy to work for mankind. It is well known among geologists that the earth contains a vast store of heat energy which is constantly percolating up from the depths of the earth and into the crustal area from whence it is emitted as heat flows into the atmosphere and out into space where its conversion into man's energy needs is forever lost. This vast store of earth's heat energy has long been noted by earth scientists in the forms of volcanoes, geysers, of which Old Faithful is a prime example, and hot mineral waters or boiling mud pots. Up to the present time little use has been made by man of this vast store of heat energy. It is the object of this invention to utilize this heat energy in a process and system designed to solve some of mankind's most perplexing problems.

CROSS-REFERENCE TO RELATED APPLICATION

The present application is a continuation-in-part of application No. 632,782, filed Apr. 21, 1967.

BACKGROUND OF THE INVENTION

Field of the invention

The present invention relates to the utilization of heat energy obtained from the depths of the earth by conduction into a fluid circulated through a closed system consisting of a well drilled into the earth into which a casing has been inserted and whose bottom is sealed and said bottom portion acts as a fluid reservoir where injected fluid can absorb heat being conducted into it from the surrounding strata and then be pumped into the surface and into distribution systems where the heat is dissipated by radiation into soils for agricultural development in regions of inclement weather, into highway and road beds to prevent the accumulation of snow and ice and into aircraft runways to prevent the accumulation of snow and ice. After the heated fluids have dissipated their heat energy they are pumped back into the well and the fluid reservoir for reheating and reuse.

Description of the prior art

Up to the present time very little use has been made by man of the tremendous amounts of heat energy contained with the earth. In a few places electrical power is being manufactured from geothermal energy, in other areas warm mineralized waters are being exploited as bath spas and in most instances expressions of earth heat energy in the forms of volcanoes, geysers and steam vents has resulted in little more than sight-seeing attractions.

Brief summary of the invention

In contrast, the present invention proposes the capture and utilization of earth's heat energy for such vital projects as soil temperature control for agricultural expansion, frost-free highways and frost-free aircraft runways. The process and system of this invention permits the capture of heat energy from the depths within the earth and the removal of such captured heat energy into preselected locations where its radiating dissipation will serve to contribute to man's environment. It is unique and surpasses all known technology that in many locations only the normal temperature gradient known from penetrations into the depth of the earth (approximately one degree increase for each one hundred feet of depth) can contribute greatly to expansion of agricultural production through multiple cropping in temperate zone regions where weather is now a major impediment. Also, the use of controlled temperatures in top soil areas can eliminate much of the risk occasioned by the vicissitudes of nature by protecting against sudden frosts and long cold spells. It is also noteworthy that only an increase in depth is required to obtain an increase in temperature where specific heat energy requirements are known. In many areas on the earth only cold, inclement weather is all that prevents agricultural seasons or extensions of seasons, yet, beneath all such areas within the earth's crustal region exists the heat energy which this invention envisages exploiting. This invention originates a utilization of both the normal temperature gradient and the abnormally high temperature gradients by virtue of its distribution aspects combined with the fluid heat mining process and the fluid distribution system in an enclosed circulation body, and includes a conservation of such heat energies since their constant percolation up through the earth's crust and their eventual dissipation into the atmosphere has heretofore precluded the capture and utilization of such heat energy before it is lost in space. Another advantage of this invention in its application of heating cultivated soils for agriculture is its potential for shortening the periods from germination to flowering of many plant species and thus expanding our agriculture technology in a little known area. Optimal root temperatures of many varieties of plants are not presently known and this invention has great potential for advancing agricultural technology. In another of this invention's aspects, the process and system permits the transferring of deep seated earth heat energy into highway and road beds where the implanted heat energy can serve to eliminate the accumulations of snow and ice in cold areas and replace costly conventional snow and ice removal techniques. Optimal road bed temperatures can serve to extend road bed life by limiting the contraction-expansion deteriorations resulting from extreme temperature variations and by eliminating the use of ponderous snow and ice removal equipment. Also, in a similar aspect, the use of highways, roads and aircraft runways protected from the accumulations of snow and ice can be used with far greater safety and reliability than present systems permit.

This invention permits the utilization of temperatures obtained from depths within the earth's interior through a process and system which in many cases requires only nominal temperatures from a few degrees in certain areas to many degrees in other areas where extreme climatic variations occur. Thus, in many areas this invention will make use of low ambient temperatures which exist everywhere in the earth's normal geothermal temperature gradient. Another distinct advantage of this invention is that it will permit the use of wells drilled for other minerals which failed to find their objectives but penetrated the earth to sufficient depths where the geothermal temperature gradient may be captured through the installation of a well casing and reserved for future use by virtue of this process and system. This would make every well drilled to certain minimum depths a potential commercial value and eliminating much of the waste of capital resources from exploratory drilling.

BRIEF DESCRIPTION OF THE DRAWINGS

These and many other attendant advantages of the inventive process and system will readily be appreciated when they become better understood by reference to the following detailed description when considered in connection with the accompanying drawings, in which:

Referring now to FIGS. 1 and 3, the process and system of this embodiment includes a well 11 extending from the surface of the earth 9 through the upper formations 10 of the earth's crust into a geothermal heart formation 12. The sides of the well 11 are covered with a metal casing 1 which is surrounded by a cement exterior layer. The bottom of the casing 13 is plugged by a suitable means such as a concrete plug. The casing extends through subsurface zone 10 and the bottom portion 2 is submerged in a geothermal zone 12 containing sufficient geothermal energy to heat fluid 14 to the desired temperature. The bottom portion 2 forms a reservoir for fluid 14. Disposed within the casing 1 and extending from the pump 5 to the fluid reservoir 2 is the injection pipe 3 through which fluid is pumped by means of pump 5 into the fluid reservoir 2 consisting of the bottom portion of the well casing 1 for heating the fluid by the geothermal formation 12 by conduction. After the fluid 14 in the fluid reservoir 2 has absorbed the heat energy from the geothermal formation 12 it is pumped by means of pump 6 through the withdrawal pipe 4 and into the distribution circulating pipes 7 from whence its contained heat will dissipate by radiation to warm the top soil 9. After the heated fluid 14 has cooled by radiating its heat into the top soil 9 it is returned by pump 5 to the intake pipe 3 for return to the fluid reservoir for reheating. An additional well 8 may be provided to supplement well 11 in distributing fluid to large areas.

Figure 1:
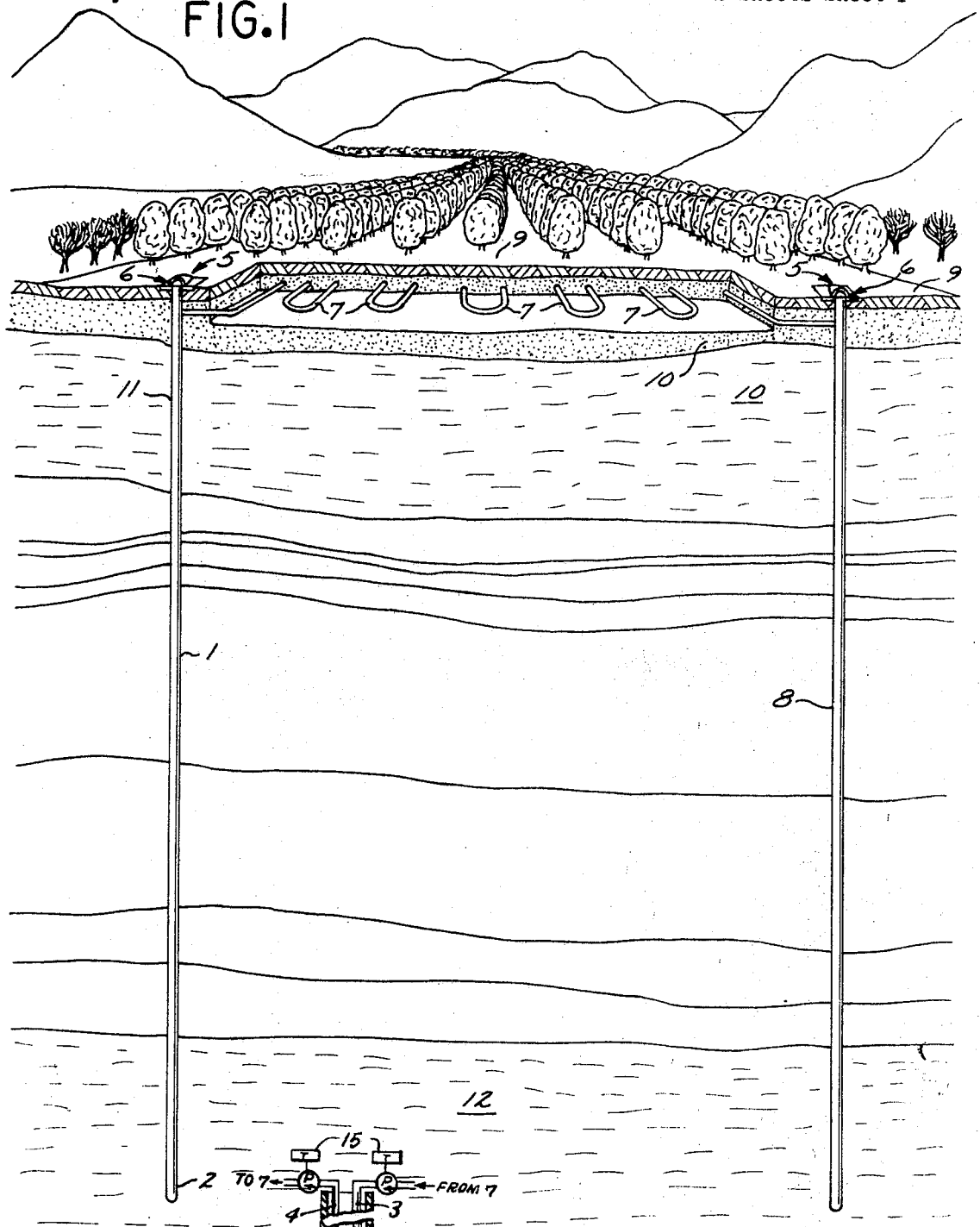
FIG. 1 is a schematic view illustrating a closed system for agricultural heat irrigation.
Figure 3:
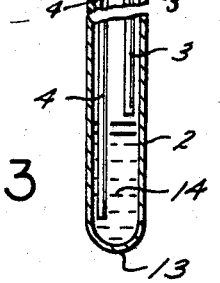
FIG. 3 is an enlarged sectional view of the fluid reservoir disposed in the bottom portion of the well casing of FIGS. 1 and 2.
Figure 2:
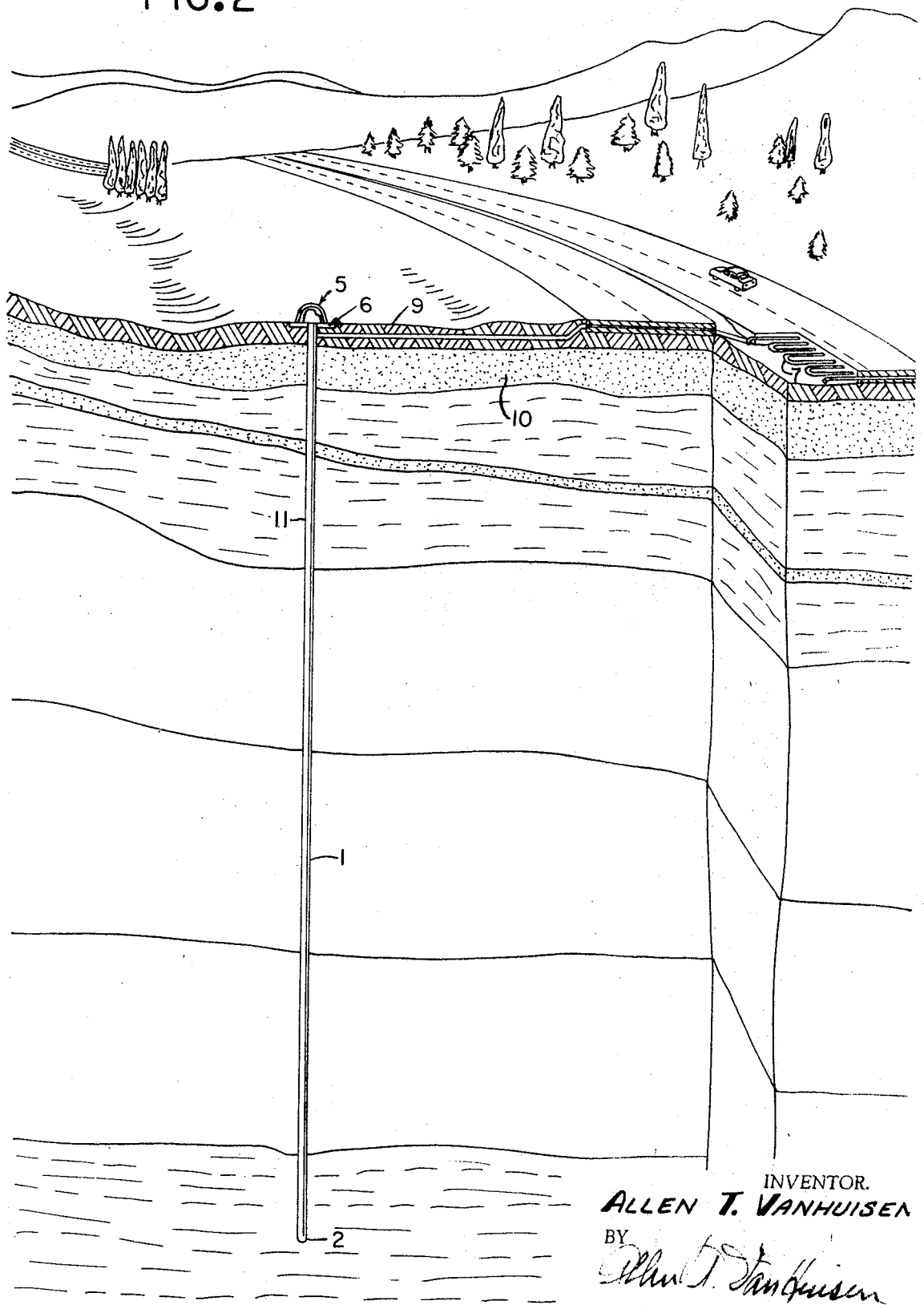
FIG. 2 is a schematic view of a closed system for heating road beds of highway.

After installation of the process and system a desired fluid such as distilled water, oil or other fluid of prime heat conduction capacity is injected through pump 5 and through the intake pipe 3 to the fluid reservoir 2 for heating from geothermal zone 12 and thereafter is recirculated as needed. The temperature of the cultivated soil surface 9 is controlled at a selected temperature by means of thermostats 15 which are operatively connected to pumps 5 and 6 and activate the pumping action of the pumps when the temperature of the soil surface 9 falls below a set temperature.

With respect to the drilling of the well, conventional oil and gas drilling procedures are adequate and when a specific temperature is desired, use of the normal geothermal energy gradient (one degree increase for each one hundred feet of penetration) can be utilized to establish a desired depth. If higher temperatures than the normal geothermal temperature gradient are desired geothermal prospecting employing conventional geophysical methods to locate faults and higher than average heat flows eminating from the earth's surface can be employed prior to the drilling of the wells to obtain a higher than average geothermal gradient.

With respect to the geothermal industry, little mention and practically no use has been made of geothermal heat energy in the temperature range below that which is required for the moving of a prime steam turbine to manufacture electrical power. This process and system enables the utilization of lower than electrical power manufacturing ambient geothermal temperature and thus, expands the infant geothermal industry potential into a broader area of utilization by mankind. In the area of agricultural technology great benefits can be accomplished from the control of ambient soil temperatures in determining temperature tolerances of various plants, germination reactions to various temperatures and potentials for shortening time from germination to flowering. In those areas presently agriculturalized but restricted by inclement weather to limited growing seasons, multiple croppings can be effected from the use of this process and system.

The further application of this invention to maintain temperatures of concrete highways and roads can be utilized to prevent contraction and expansion of concrete due to extreme temperature variations and thus extend the life of costly roadbeds as well as eliminate costly conventional methods or removing snow and ice. This application will also serve to aid aircraft runways located in inclement weather areas.

What is claimed is:

1. A closed system for heat irrigation of near surface earth strata such as cultivated soil, road beds, aircraft runways and the like comprising in combination;
   - a geothermal well comprising a metal casing communicating a geothermal subsurface zone and said near surface earth strata;
   - means for plugging the bottom of the casing;
   - a reservoir of heat exchange fluid disposed within the lower extremity of the plugged casing;
   - a fluid outlet tube disposed within the casing extending into the reservoir;
   - a fluid inlet tube disposed within the casing communicating with the reservoir;
   - a heated fluid distribution system having an inlet and an outlet extending through said near surface earth strata adjacent said well;
   - a first pump communicating said inlet with said outlet tube;
   - a second pump communicating said outlet with said inlet tube; and
   - thermally responsive means operatively connected to said pumps for actuating and deactuating said pumps in response to changes in the termperature of asid strata from a preselected temperature.

2. A system according to claim 1 wherein said system employs a circulating distribution system installed within cultivated soil substrata.

3. A system according to claim 1 in which said geothermal well comprises a metal casing and a concrete casing surrounding the exterior of the metal casing.

4. A system according to claim 1 in which said means for plugging comprises a concrete plug formed in the bottom of said casing.

5. A system according to claim 1 in which said fluid is distilled water.

6. A method of maintaining near surface earth strata such as cultivated soil, road beds, aircraft runways and the like at a set temperature comprising the steps of:
   - disposing a reservoir of heat conducting fluid in a closed casing disposed within a geothermal heat zone;
   - disposing a closed, circulating, fluid distribution system within said strata;
   - pumping hot fluid from said reservoir to the inlet to said system and through said system to raise the temperature of said strata;
   - pumping cooler fluid from the outlet to said system to said reservoir; and
   - actuating said pumps in response to a decrease in the temperature of said strata below said temperature.

7. A method according to claim 6 in which said pumping is deactuated when said strata reaches said temperature.

8. A method according to claim 6 in which said fluid is selected from distilled water and oil.

9. A method according to claim 6 in which said strata is cultivated soil.

10. A system according to claim 1 wherein said system employs a distribution system installed within highway and road beds.

11. A system according to claim 1 wherein said system employs a distribution system installed within substratas of aircraft runways.

References Cited

UNITED STATES PATENTS

| | | | |
|---|---|---|---|
| 2,438,720 | 3/1948 | Smith | 165—45 |
| 2,461,449 | 2/1949 | Smith et al. | 165—45 |
| 2,554,661 | 5/1951 | Clancy | 165—45 |
| 3,195,619 | 7/1965 | Tippmann | 62—260 |

ROBERT A. O'LEARY, Primary Examiner

C. SUKALO, Assistant Examiner

U.S. Cl. X.R.

165—45; 126—343.5